United States Patent
Chang et al.

(10) Patent No.: US 8,675,600 B2
(45) Date of Patent: Mar. 18, 2014

(54) METHOD FOR TRANSMITTING SIGNALS

(75) Inventors: Sung Cheol Chang, Daejeon (KR); Kwang Jae Lim, Daejeon (KR); Sung Kyung Kim, Daejeon (KR); Hyun Lee, Daejeon (KR); Chul Sik Yoon, Daejeon (KR)

(73) Assignees: Samsung Electronics Co., Ltd., Suwon-Si (KR); Electronics & Telecommunications Research Institute, Daejeon (KR)

( * ) Notice: Subject to any disclaimer, the term of this patent is extended or adjusted under 35 U.S.C. 154(b) by 583 days.

(21) Appl. No.: 12/734,323

(22) PCT Filed: Oct. 23, 2008

(86) PCT No.: PCT/KR2008/006283
§ 371 (c)(1),
(2), (4) Date: Apr. 23, 2010

(87) PCT Pub. No.: WO2009/054690
PCT Pub. Date: Apr. 30, 2009

(65) Prior Publication Data
US 2010/0246531 A1 Sep. 30, 2010

(30) Foreign Application Priority Data

Oct. 23, 2007 (KR) .......... 10-2007-0106556
Sep. 3, 2008 (KR) .......... 10-2008-0086938

(51) Int. Cl.
*H04W 4/00* (2009.01)
(52) U.S. Cl.
USPC ............ 370/331; 370/335; 370/342; 370/441

(58) Field of Classification Search
USPC .......... 370/329–331, 335, 342, 441
See application file for complete search history.

(56) References Cited

U.S. PATENT DOCUMENTS

| | | | |
|---|---|---|---|
| 5,396,649 A * | 3/1995 | Hamabe | 455/513 |
| 6,490,261 B1 * | 12/2002 | Dent et al. | 370/337 |
| 6,731,623 B2 | 5/2004 | Lee et al. | |
| 6,930,993 B1 * | 8/2005 | Hamada et al. | 370/347 |
| 7,221,680 B2 * | 5/2007 | Vijayan et al. | 370/441 |
| 7,436,809 B2 * | 10/2008 | Harada et al. | 370/338 |
| 8,037,395 B2 * | 10/2011 | Katayama et al. | 714/784 |
| 2002/0001296 A1 | 1/2002 | Lee et al. | |
| 2006/0116144 A1 * | 6/2006 | Song et al. | 455/509 |

(Continued)

FOREIGN PATENT DOCUMENTS

| | | |
|---|---|---|
| JP | 2001-352315 | 12/2001 |
| JP | 2002-009743 | 1/2002 |
| WO | WO2007/069848 A2 | 6/2007 |

OTHER PUBLICATIONS

International Search Report and Written Opinion of International Searching Authority dated May 25, 2009 in relation to International Application No. PCT/KR2008/006283.

*Primary Examiner* — Phuc Tran

(57) ABSTRACT

A signal receiving method includes allocating a communication resource corresponding to a mobile station over a plurality of frames, transmitting allocation information on the communication resource to the mobile station, and receiving a transmitted signal through the communication resource. Therefore, the resource allocated on the frequency axis is minimized by allocating the resource to the mobile station over a plurality of frames, and the resource is allocated within the limited power of the mobile station, thereby improving radio performance.

11 Claims, 12 Drawing Sheets

(56) References Cited

U.S. PATENT DOCUMENTS

| | | |
|---|---|---|
| 2007/0191015 A1 | 8/2007 | Hwang et al. |
| 2008/0311919 A1* | 12/2008 | Whinnett et al. ............. 455/447 |
| 2008/0311961 A1* | 12/2008 | Cotevino et al. ............. 455/574 |
| 2009/0022098 A1* | 1/2009 | Novak et al. .................. 370/329 |
| 2009/0116434 A1* | 5/2009 | Lohr et al. .................... 370/329 |
| 2009/0196249 A1* | 8/2009 | Kawamura et al. ........... 370/330 |
| 2009/0316811 A1* | 12/2009 | Maeda et al. .................. 375/260 |
| 2010/0189049 A1* | 7/2010 | Lim et al. ....................... 370/329 |
| 2010/0296436 A1* | 11/2010 | Kwon et al. .................. 370/328 |

* cited by examiner

METHOD FOR TRANSMITTING SIGNALS

CROSS-REFERENCE TO RELATED APPLICATION(S)

The present application is related to International Application No. PCT/KR2008/006283 filed Oct. 23, 2008 entitled "METHOD FOR TRANSMITTING SIGNALS" which claims priority to Korean Patent Application Nos. 10-2007-0106556 filed Oct. 23, 2007 and 10-2008-0086938 filed Sep. 3, 2008. International Application No. PCT/KR2008/006283 is assigned to the assignee of the present application and is hereby incorporated by reference into the present disclosure as if fully set forth herein. The present application hereby claims priority under 35 U.S.C. §119(a) to International Patent Application No. PCT/KR2008/006283 and Korean Patent Application Nod. 10-2007-0106556 and 10-2008-0086938.

TECHNICAL FIELD

The present invention relates to a method for transmitting signals. Particularly, the present invention relates to a method for a plurality of frames to transmit signals.

BACKGROUND ART

In a wireless mobile communication system including a base station and a mobile station, the base station covers cells for managing radio resources and the mobile station exchanges signals with the base station through an allocated resource.

The base station transmits signals to the mobile station in the downlink, the mobile station transmits signals to the base station in the uplink, and the corresponding resource is allocated and managed by the base station.

The base station reflects on the demand for the resource in the frame, considers users' service needs, and divides and allocates the resource per frame. The resource is temporally divided per frame, and the frame is divided into a downlink subframe and an uplink subframe.

When the IEEE 802.16 communication system is exemplified, resource allocation information is included in the MAP at the former part of the downlink subframe and it includes a downlink and uplink resource user, an allocated resource position, and a size. Also, a transmitter confirms a signal by checking a resource with the MAP information element (IE), and performs channel coding and modulation. The channel coding process converts data with a predetermined size into a format appropriate for transmission.

The base station fixedly allocates the resource for transmitting the fixed data.

Resource allocation information is repeated in the case of resource allocation on the data having a fixed size and period for a predetermined period such as a voice service. That is, the base station allocates a size and a position of the resource in the stage of resource allocation, and provides a condition for a transmitter/a receiver to determine the same resource during the repeated time.

The fixed resource allocation method reduces MAP information that is transmitted for the purpose of allocating the corresponding resource for each frame.

A hybrid ARQ (HARM) is used for retransmission when the received data generates an error regarding the fixedly allocated resource. The receiver provides information on the data received state to the transmitter, and the transmitter retransmits corresponding data. The receiver combines the currently received data and the previously received data to restore the data.

In addition, the available power for the mobile station is limited, and in general, the base station uses several tens of Watts, and the mobile station uses several hundreds of mWatts. Therefore, it is required to consider the limited power of the mobile station in the resource allocation process.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for transmitting signals by allocating a resource in consideration of a power limit of a mobile station.

Technical Solution

An exemplary embodiment of the present invention provides a method for receiving signals including: allocating a communication resource corresponding to a mobile station over a plurality of frames; transmitting allocation information of the communication resource to the mobile station; and receiving a transmitted signal through the communication resource.

Power required by the communication resource of a frame is less than the maximum power of the mobile station.

The transmitted signal includes at least two coding blocks that are channel coded for a datum.

The transmitting of allocation information of the communication resource includes transmitting a single piece of allocation information to the mobile station in the plurality of frames for transmitting the coding block of the datum.

The transmitting of allocation information of the communication resource includes transmitting allocation information of the communication resource of the frame to the mobile station for each frame.

Allocation information of the communication resource includes transmission period information of the data.

The method further includes, when the communication resource is additionally needed, additionally allocating the communication resource to the mobile station, and additional allocation information of the communication resource to the mobile station in the frame including the communication resource.

The method further includes, when the communication resource allocated to the mobile station is allocated to another mobile station, allocating the communication resource to the other mobile station, and transmitting information on the allocation of the communication resource to the other mobile station to the mobile station in the frame including the communication resource.

The method further includes, when the coding block is requested to be retransmitted, allocating the communication resource for the retransmission, and transmitting allocation information of the communication resource to the mobile station in the frame including the communication resource.

Advantageous Effects

According to the present invention, the method for allocating the resource to the mobile station over a plurality of frames minimizes the resource allocated in the frequency axis to allocate the resource within the range of the limited power of the mobile station and to improve radio performance.

Further, the data are expressed by a MAP IE in the packet type resource allocation to reduce a MAP error probability and minimize the MAP size for expressing the resource. Also, the resource can be fluently utilized by including a MAP IE for allocating the resource for each frame.

In addition, the resource allocated in the frequency axis is minimized by periodically repeating the resource that is allocated over a plurality of frames and fixedly allocating the same, and the resource can be efficiently used by omitting the MAP IE for expressing repeated resource allocation. Further, the fixed allocation resource can be optimized for each frame by changing the position of the resource that is allocated per frame.

Also, the packet type resource allocation is used and the resource can be temporarily added in a bad channel environment by allocating the resource according to a mixed method and adapting to a channel worsened environment when the channel is changed.

In addition, the fixed allocation resource can be temporarily allocated to another user when the channel environment is improved from the fixedly allocated resource by using a fixed resource contribution method.

MODE FOR THE INVENTION

Figure 1:
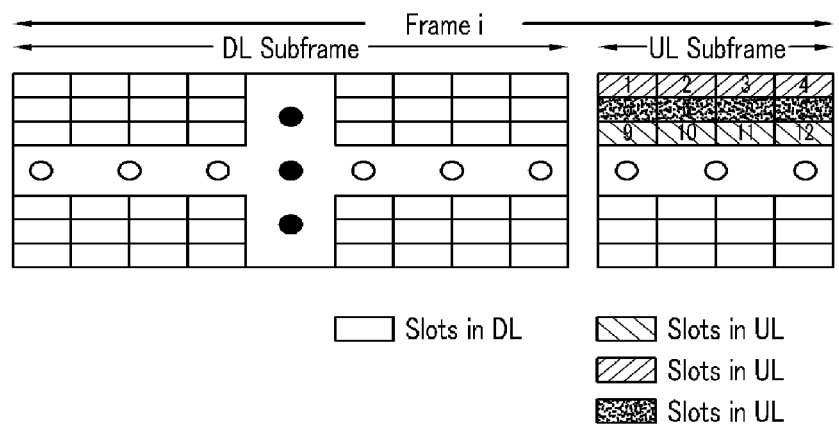
FIG. 1 shows a frame structure in a TDD system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" and "comprising", will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, a mobile station (MS) may indicate a terminal, a mobile terminal (MT), a subscriber station (SS), a portable subscriber station (PSS), user equipment (UE), and an access terminal (AT), and may include entire or partial functions of the terminal, MT, SS, PSS, UE, and AT.

A base station (BS) may indicate an access point (AP), a radio access station (RAS), a nodeB (Node B), an evolved node-B (eNB), a base transceiver station (BTS), and a mobile multihop relay (MMR)-BS, and may include entire or partial functions of the AP, RAS, nodeB, eNB, BTS, and MMR-BS.

A method for a base station to allocate a resource will now be described with reference to FIG. 1 to FIG. 3.

Figure 2:
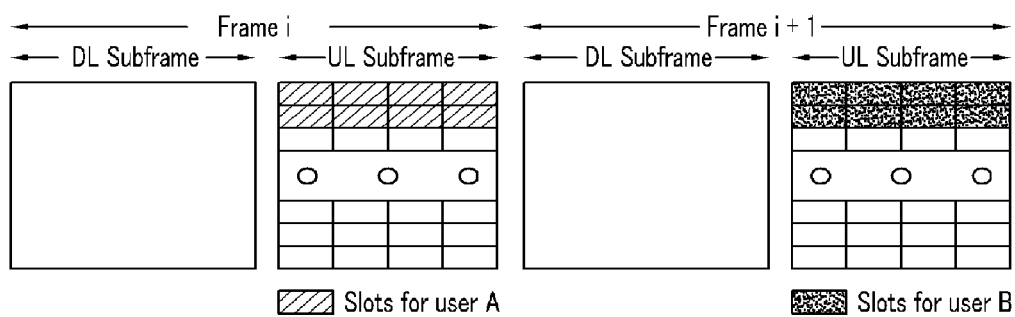
FIG. 2 shows a frame for allocating a resource when a required power is less than a peak power of a mobile station.
Figure 3:
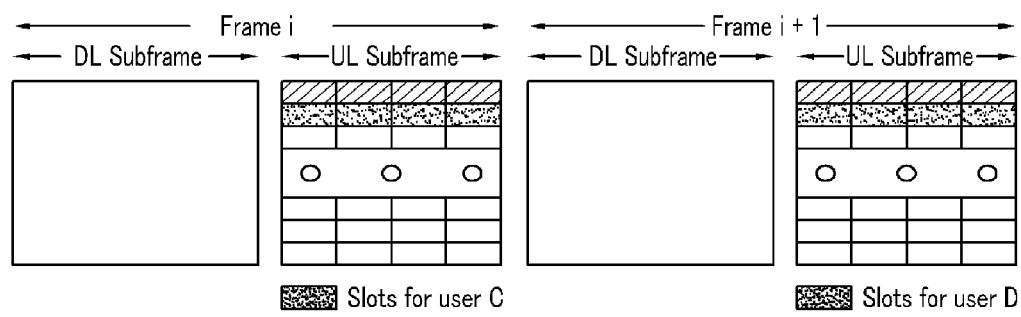
FIG. 3 shows a frame for allocating a resource when a required power is greater than a peak power of a mobile station.

FIG. 1 shows a frame structure in a TDD system, FIG. 2 shows a frame for allocating a resource when a required power is less than a peak power of a mobile station, and FIG. 3 shows a frame for allocating a resource when a required power is greater than a peak power of a mobile station.

Referring to FIG. 1, in a time division duplex (TDD) communication system, a frame includes a downlink (DL) subframe and an uplink (UL) subframe.

The subframes are identified by a slot, which is the minimum unit for allocating a resource in the MAC layer.

In this instance, the size of the corresponding slot can be different for the uplink and the downlink.

In the case of comparing a first case, in which a mobile station receives four slots from the first to the fourth slots, and a second case, in which it receives eight slots from the first to the eighth slots, when the mobile station is positioned in the radio channel environment requiring the maximum power, the respective slots when the eight slots are allocated receive half the power compared to the respective slots when the four slots are allocated.

Therefore, since the power that is allocated for each slot is reduced and the channel performance is reduced, the whole performance is similar to the case of four slots when the number of slots is doubled.

Burst data includes a basic coding block, and also includes a repeated coding block that is generated by repeating the basic coding block. The repeated coding block needs an additional resource for transmission. In this instance, when the power for each resource is reduced, the radio channel performance is not improved.

A method for transmitting burst data over a plurality of frames will now be described with reference to FIG. 2 and FIG. 3.

When the power required for the allocated resource in the radio channel between the mobile station and the base station is less than the maximum power of the mobile station, the resource can be allocated within a frame.

However, when the power required for the resource allocated within a frame is greater than the maximum power of the mobile station, the resource for transmitting the burst data can be allocated over a plurality of frames.

Referring to FIG. 2, when the power required for the allocated resource is less than the maximum power of the mobile station, eight slots from the first slot to the eighth slot are allocated within the uplink subframe as a resource for the user A in the i-th frame, and eight slots from the first slot to the eighth slot are allocated to the user B within the uplink subframe of the (i+1)-th frame.

The mobile stations of the users A and B transmit data through the eight slots with a power that is less than the maximum power of the mobile station.

In this instance, the power required for the mobile station is twice the power required for one slot regarding the eight slots that are allocated to the user A because the eight slots are allocated over the 2-row slots of the frequency axis. Therefore, the maximum power of the mobile station is required to be equal to or greater than the power required by the 2-row slots on the frequency axis.

When the maximum power of the mobile station is less than the power required for the mobile station, the user C and the user D respectively receive eight slots over a plurality of frames as shown in FIG. 3. That is, the user C receives the slots from the first to fourth slots in the i-th frame and the slots from the first to fourth slots in the (i+1)-th frame, and the user D receives the slots from the fifth to eighth slots in the i-th frame and the slots from the fifth to eighth slots in the (i+1)-th frame.

Therefore, since the user C and the user D receive eight slots and occupy one row on the frequency axis, the power required for each mobile station corresponds to the case of receiving one slot.

That is, when the user A of FIG. 2 and the user C of FIG. 3 are compared, the user A needs twice the power of the user C while receiving eight slots.

Therefore, when allocating the resource for one mobile station over a plurality of frames, radio performance can be improved since the allocated resource requires power that is not greater than the maximum power of the mobile station.

Various exemplary embodiments having applied a method for allocating the resource over a plurality of frames will now be described in a like manner of FIG. 3.

Figure 4:
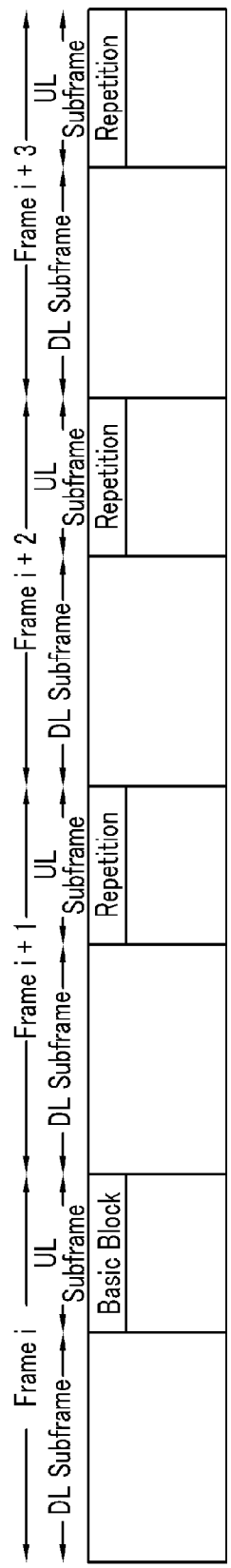
FIG. 4 and FIG. 5 show a method for allocating resources of a plurality of frames considering a coded basic block.
Figure 5:
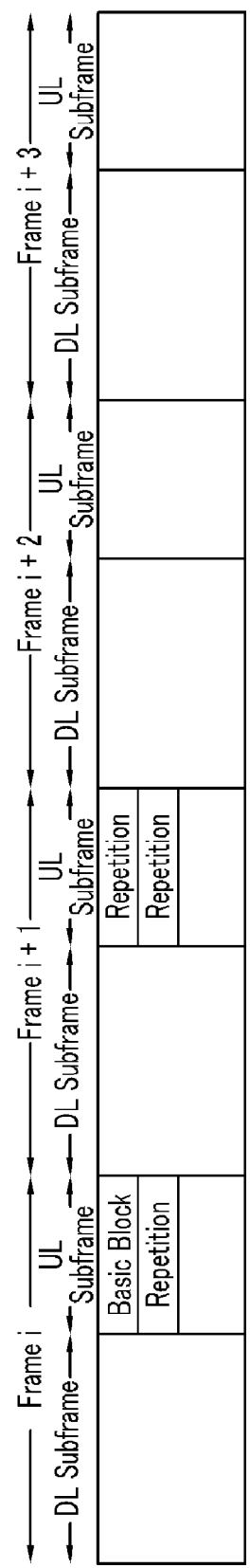
Figure 6:
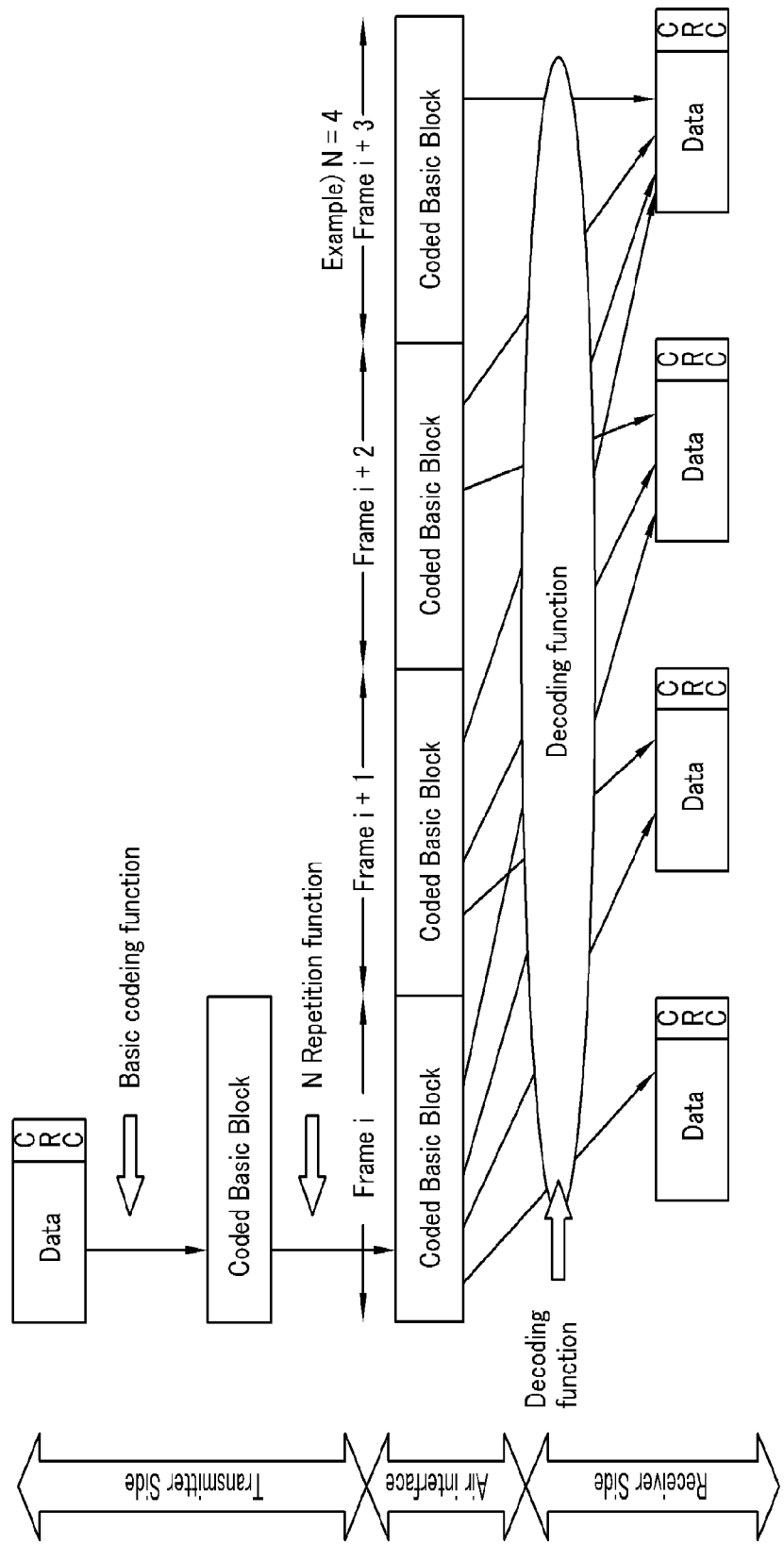
FIG. 6 shows a method for allocating and receiving resources of a plurality of frames considering a coded basic block.

FIG. 4 and FIG. 5 show a method for allocating resources of a plurality of frames considering a coded basic block, and FIG. 6 shows a method for allocating and receiving resources of a plurality of frames considering a coded basic block.

A radio channel coding is configured with basic coding and repeated coding, and the repeated coding repeats the result generated from the basic coding.

The repeated coding includes configuring the data according to the incremental redundancy (IR) method, and it generates a repeated coding block including data of the coded basic block generated from basic coding or data generated from the coded basic block.

For example, three repeated coding blocks can be generated for one coded basic block as shown in FIG. 4 and FIG. 5.

When allocating the resource for one mobile station over a plurality of frames, four coding blocks including a basic coding block can be allocated over four consecutive frames as shown in FIG. 4. That is, each frame includes a resource that is allocated corresponding to one coding block.

Two consecutive frames can include a resource that is allocated corresponding to four coding blocks as shown in FIG. 5. In this instance, the power required by the resource that is allocated corresponding to the two coding blocks has a value that is less than the maximum power of the mobile station.

The burst data that are transmitted over a plurality of frames are restored by using the coding blocks that are received per frame from the base station.

Referring to FIG. 6, a transmitter side channel-codes the burst data together with cyclic redundancy check (CRC) data to generate a coded basic block and transmit the same to the i-th frame, and repeats the coded basic block to transmit it to the consecutive frames.

A receiver side channel-decodes the received coded basic block and the repeated coding block to restore the burst data, and checks whether the restored burst data are successful through the CRC data.

In this instance, the coding block after the i-th frame is restored referring to the coding block of the previous frame.

The method for allocating the resource over a plurality of frames includes a packet method, a circuit method, and a mixed method.

The packet method forms a MAP IE on all allocated resources, the circuit method periodically allocates the allocated resource, and the mixed method allocates the resource according to the circuit method, and allocates the resource according to the packet method when the allocated resource is changed.

A method for expressing the resource allocated in the packet method is classified as a method for expressing the resource over a plurality of frames with a single MAP IE and a method for expressing the resource allocated per frame with the MAP IE.

A method for expressing the resource allocated in the circuit method is classified as a method for expressing the periodically allocated resource with a single MAP IE and a method for expressing the resource that is allocated per frame with the MAP IE.

The mixed method combines and uses the MAP IE configurations used by the packet method and the circuit method.

A method for allocating a resource for a mobile station over a plurality of frames in the resource allocation of the packet method will now be described with reference to FIG. 7 to FIG. 9.

Figure 7:
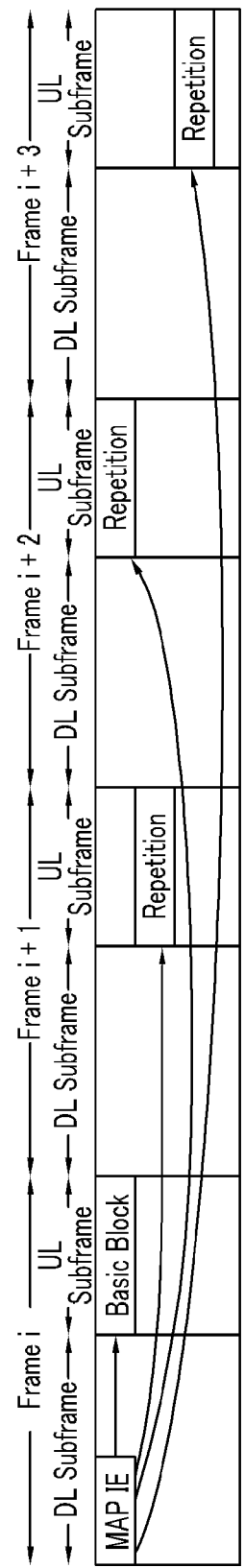
FIG. 7 shows a method for configuring a MAP IE in a packet based resource allocation method.
Figure 8:
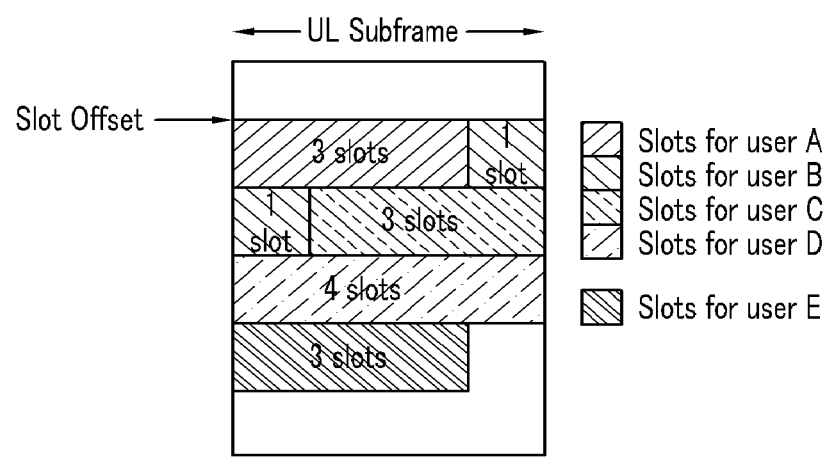
FIG. 8 shows a method for determining a resource allocated according to a MAP IE.
Figure 9:
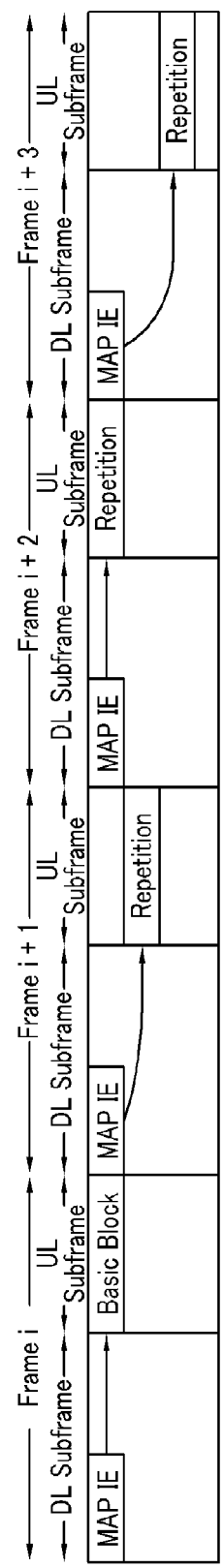
FIG. 9 shows a MAP IE of packet based resource allocation and frame based resource allocation.

FIG. 7 shows a method for configuring a MAP IE in a packet based resource allocation method, FIG. 8 shows a method for determining a resource allocated according to a MAP IE, and FIG. 9 shows a MAP IE of packet based resource allocation and frame based resource allocation.

In the packet type resource allocation, the resource that is allocated corresponding to a plurality of coding blocks over a plurality of frames is expressed by the MAP IE.

When a datum is configured with four coding blocks as shown in FIG. 7, the MAP IE for expressing resource allocation on the four coding blocks is arranged in a downlink subframe region of the i-th frame to which the first coding block is transmitted.

Table 1 shows the MAP IE of FIG. 8.

TABLE 1

| Syntax | Size | Notes |
|---|---|---|
| BROF_UL_MAP_IE { | | |
| RCID IE( ) | | User Identifier |
| UIUC | 4 bits | |
| Repetition Coding Indication | 2 bits | 0b00 - No repetition coding |
| | | 0b01 - Repetition coding of 2 used |
| | | 0b10 - Repetition coding of 3 used |
| | | 0b11 - Repetition coding of 4 used |
| N Frames | 2 bits | The number of frames |
| For (i=0; i<N Frames; i++) { | | |
| Frame Offset | 3 bits | The frame in which the block islocated. |
| Slot Offset | 10 bits | The slot at which the block begins |
| Duration | 10 bits | The number of slots |

TABLE 1-continued

| Syntax | Size | Notes |
|---|---|---|
| SPID | 2 bits | Sub-packet ID |
| } | | |

Referring to Table 1, a UL interval usage code (UIUC) represents information for configuring a coded basic block, and the repetition coding indication represents a number of coding blocks that are repeated within the frame.

The N frames represents the number of frames in which the coding block is positioned, the frame offset indicates a difference between the current frame and the frame in which the coding block is positioned, the slot offset means a start position of the allocated resource, and the duration is the size of the allocated resource per slot.

The SPID represents a packet position of data that are transmitted in the corresponding frame when transmitting different data to the resource that is allocated to a plurality of frames according to a coding scheme, and is a sub packet number for indicating a position of the coded data transmitted per frame when coding the data with the IR method.

In this instance, the frame offset field can be omitted, and the N frames expressed by the MAP IE can allocate the resource with a fixed frame period.

That is, when allocating a coding block to consecutive frames, the consecutive frames designated by the N frames field can be given as frames in which subsequent coding blocks are allocated, and the frame offset field can be omitted.

Also, the slot offset field can be omitted for each resource by computing the allocated resource by using the MAP IE in the current frame and the previously received MAP IE.

For example, as shown in FIG. 8, the resource is consecutively allocated to the users from the user A to the user E at the point designated by the slot offset.

The position of the resource allocated to the user E can be expressed as duration by the previous user allocation information. Therefore, the slot offset can be omitted by applying this principle to Table 1 and computing information allocated in the frame.

Table 2 shows a configuration of a MAP IE in the condition in which a resource is allocated to consecutive frames and a start position of the currently allocated resource can be acquired by allocation information of a previous MAP IE.

TABLE 2

| Syntax | Size | Notes |
|---|---|---|
| BROF_UL_MAP_IE { | | |
| RCID IE( ) | | User Identifier |
| UIUC | 4 bits | |
| Repetition Coding Indication | 2 bits | 0b00 - No repetition coding |
| | | 0b01 - Repetition coding of 2 used |
| | | 0b10 - Repetition coding of 3 used |
| | | 0b11 - Repetition coding of 4 used |
| N Frames | 2 bits | The number of frames |
| For (i=0; i<N Frames; i++) | | |
| { | | |
| Duration | 10 bits | The number of slots |
| SPID | 2 bits | Sub-packet ID |
| } | | |
| } | | |

In this instance, a field for showing a position at which a resource is allocated is additionally required in a specific frame.

Also, the MAP IE can be configured for respective data with a field for generating once an expression for the resource that is allocated so as to allocate the same resource per frame and then indicating a frame position for expressing the subsequently allocated resource.

In this instance, the position of the same resource per frame includes an absolute position and a relative position. Resource allocation of the same relative position needs a reference for the relative position, and the corresponding reference is acquired from the MAP IE transmitted per frame.

For example, the resource used per frame is allocated in the rectangular format, and the relative position can be sequentially computed from the rear part in the rectangular resource. Therefore, the relative position is fixed and the absolute position within the frame is variable.

The MAP IE for indicating the allocated resource can be configured by frames. The MAP IE for indicating the allocated resource is received from the downlink subframe of the corresponding frame for each frame including the resource corresponding to the coding block as shown in FIG. 9.

Table 3 shows a MAP IE of FIG. 9.

TABLE 3

| Syntax | Size | Notes |
|---|---|---|
| BROF_UL_MAP_IE { | | |
| RCID IE( ) | | User Identifier |
| UIUC | 4 bits | |
| Repetition Coding Indication | 2 bits | 0b00 - No repetition coding |
| | | 0b01 - Repetition coding of 2 used |
| | | 0b10 - Repetition coding of 3 used |
| | | 0b11 - Repetition coding of 4 used |
| Slot Offset | 10 bits | The slot at which the block begins |
| Duration | 10 bits | The number of slots |
| SPID | 2 bits | Sub-packet ID |
| Burst_SN | 1 bits | Burst sequence number |
| } | | |

The fields in Table 3 correspond to those that are described with reference to Table 1. In this instance, Burst_SN represents a burst number to which the allocated resource belongs, has the value of 0 or 1, and is changed for a new burst.

A method for allocating a resource to one mobile station over a plurality of frames by using a circuit method resource allocation method will now be described with reference to FIG. 10 and FIG. 11.

Figure 10:
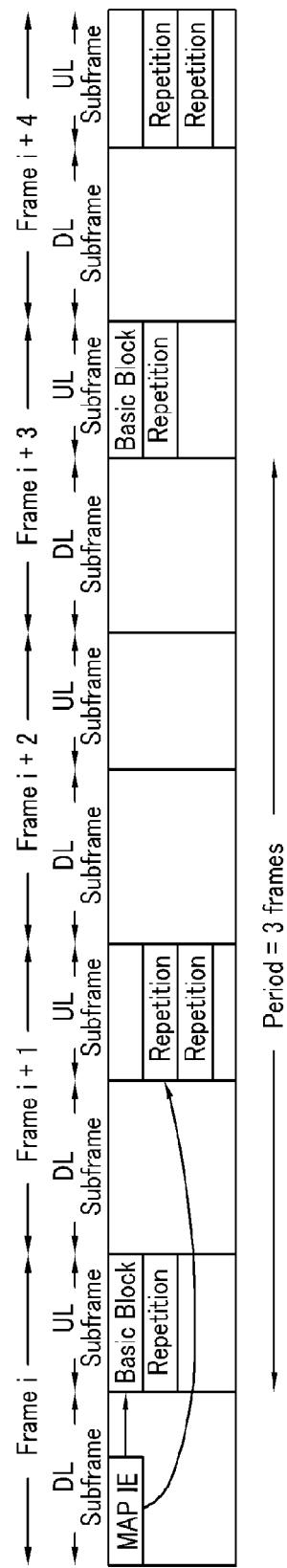
FIG. 10 shows a configuration of a MAP IE according to bursts in circuit based resource allocation.
Figure 11:
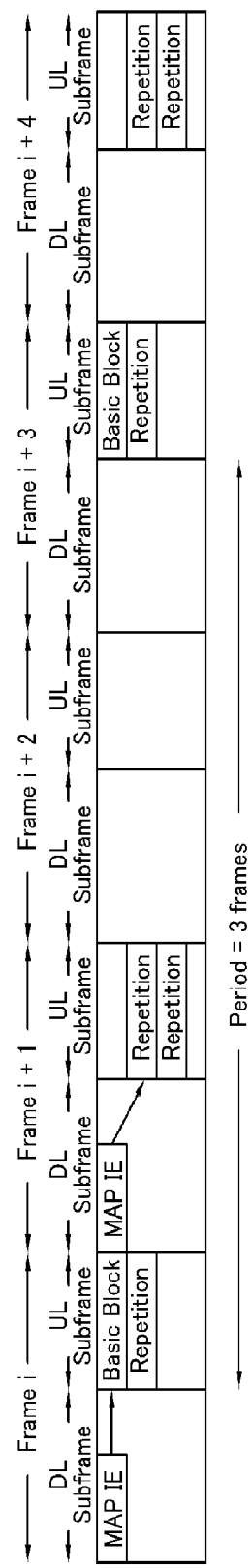
FIG. 11 shows a configuration of a MAP IE according to bursts in frame based resource allocation.

FIG. 10 shows a configuration of a MAP IE according to data in circuit based resource allocation, and FIG. 11 shows a configuration of a MAP IE according to bursts in frame based resource allocation.

When the MAP IE is configured by data in the circuit type resource allocation method, a MAP IE includes resource allocation information on a plurality of frames for transmitting a plurality of coding blocks for a datum, and the corresponding resource is periodically repeated and allocated.

FIG. 10 shows a method for fixedly allocating a resource to a plurality of frames, and for example, when four coding blocks are generated for a datum, the two consecutive frames include a resource corresponding to two coding blocks per frame.

That is, the MAP IE of the i-th frame to which the resource corresponding to the coding block of one datum is allocation indicates resource allocation information on the i-th frame and the following (i+1)-th frame. The resource is periodically allocated, and in the frame of the next period, the resource is allocated to the mobile station without the MAP IE for specifically expressing resource allocation.

Table 4 shows a MAP IE of a method for fixedly allocating a resource of a plurality of frames of FIG. 10.

TABLE 4

| Syntax | Size | Notes |
|---|---|---|
| BROF_UL_MAP_IE { | | |
| RCID IE( ) | | User Identifier |
| UIUC | 4 bits | |
| Repetition Coding Indication | 2 bits | 0b00 - No repetition coding |
| | | 0b01 - Repetition coding of 2 used |
| | | 0b10 - Repetition coding of 3 used |
| | | 0b11 - Repetition coding of 4 used |
| N Frames | 2 bits | The number of frames |
| For (i=0; i<N Frames; i++) { | | |
| Frame offset | 3 bits | The frame in which the block is located. |
| Slot Offset | 10 bits | The slot at which the block begins |
| Duration | 10 bits | The number of slots |
| SPID | 2 bits | Sub-packet ID |
| } | | |
| Period for fixed allocation | 2 bits | |
| } | | |

The fields of Table 4 correspond to those that are described with reference to Table 1, and the "period for fixed allocation" field represents a period for fixedly allocating the allocated resource, and the allocated resources are allocated with a predetermined period. Also, the target in the method for fixedly allocating the resource can be notified with a bitmap.

The MAP IE can be configured per frame as shown in FIG. 11, and in this instance, it includes a function for fixedly allocating the resource.

Regarding the two frames, the MAP IE for each frame represents the resource that is allocated to the frame, and the allocated resource is repeatedly allocated for three respective frames.

Table 5 shows a MAP IE for allocating the resource per frame.

TABLE 5

| Syntax | Size | Notes |
|---|---|---|
| BROF_UL_MAP_IE { | | |
| RCID IE( ) | | User Identifier |
| UIUC | 4 bits | |
| Repetition Coding Indication | 2 bits | 0b00 - No repetition coding |
| | | 0b01 - Repetition coding of 2 used |
| | | 0b10 - Repetition coding of 3 used |
| | | 0b11 - Repetition coding of 4 used |
| Slot Offset | 10 bits | The slot at which the block begins |
| Duration | 10 bits | The number of slots |
| SPID | 2 bits | Sub-packet ID |
| Period for fixed allocation | 2 bits | |
| First block indication | 1 bit | 0: Not first |
| | | 1: The first block of the burst |
| Allocation type | 1 bit | 0: Aggregate |
| | | 1: Incremental |
| } | | |

In Table 5, a "period for fixed allocation" field for periodically allocating the resource, a "first block indication" field for indicating whether the allocated resource is the first coding block, and an "allocation type" field for representing the type of the allocated resource are added.

When the first block indication field has the value 0, it indicates that the allocated resource is not the first coding block, and when the value is given as 1, it represents that the allocated resource is the first coding block and it notifies that new data begins in the corresponding resource.

When the allocation type field is 0 (Incremental), the allocated resource is additionally allocated in addition to the existing resource, and when it is 1 (Aggregate), the allocated resources are canceled and the resource expressed in the MAP IE is allocated.

Also, the target in the method for fixedly allocating the resource can be notified with a bitmap.

A resource allocation method over a plurality of frames in the mixed method will now be described with reference to FIG. 12.

Figure 12:
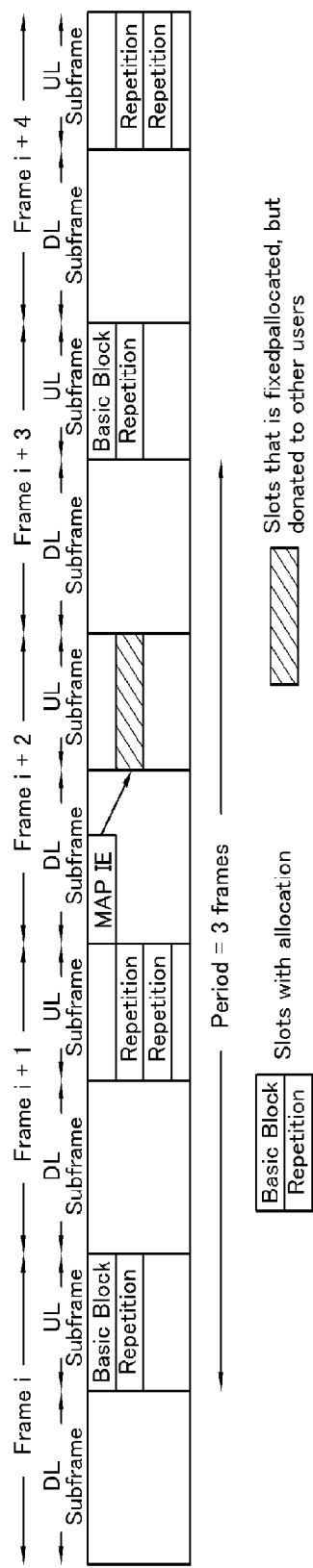
FIG. 12 shows a resource allocation method based on a mixed method according to an exemplary embodiment of the present invention.

FIG. 12 shows a resource allocation method based on a mixed method according to an exemplary embodiment of the present invention.

The mixed type resource allocation uses the packet method and the circuit method altogether. That is, it fixedly allocates the resource by using the circuit type resource allocation, and additionally allocates the resource by using the packet method.

The mixed type resource allocation can add a resource with the packet method for additional resource allocation when the radio channel is changed in a short time and the channel state is worsened. When the radio channel continues to worsen, a fixedly allocated resource is added to reduce the MAP IE required by the packet method.

As shown in FIG. 12, the resource is fixedly allocated in the i-th frame and the (i+1)-th frame, and the fixed allocation is repeated for three respective frames. In this instance, when it is determined that a further resource is needed to be allocated, the MAP IE for additionally allocating the resource through the packet method is received in the (i+2)-th frame.

A fixed resource contribution method over a plurality of frames will now be described with reference to FIG. 13.

Figure 13:
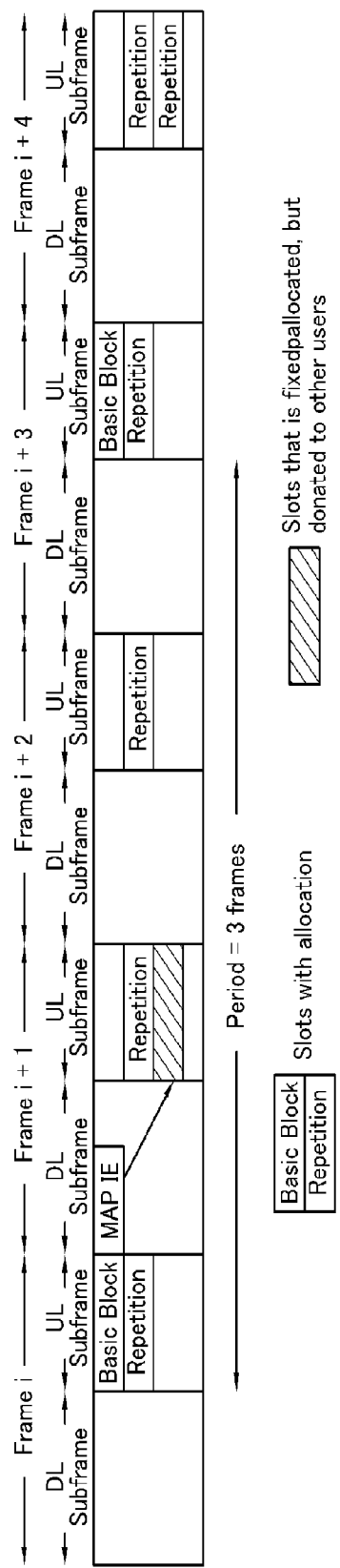
FIG. 13 shows a resource allocation method based on a fixed resource contribution method.

FIG. 13 shows a resource allocation method based on a fixed resource contribution method.

The resource that is fixedly allocated so as to correspond to a radio channel change is recovered from the resource that is fixedly allocated to a plurality of frames by using the packet method, and is then allocated to another user. Therefore, a contribution bitmap is added in the MAP, and the resource designated by the contribution bitmap is allocated according to the packet method.

The contribution bitmap represents information for expressing the state of whether the fixedly allocated resource is recovered in the frame, for respective resources.

The base station configures a contribution bitmap by selecting a resource to be allocated by the packet method in the fixed allocation resource, and uses the corresponding resource in the corresponding frame through the packet method.

The mobile station receives the contribution bitmap to determine the contribution state of the fixedly allocated resource, and does not use it as a fixed resource in the corresponding frame when it is contributed.

The mobile station uses the fixed resource that is not contributed in the corresponding frame.

When failing to receive the contribution bitmap by failing to receive the MAP IE, the mobile station transmits data by using the fixed resource.

As shown in FIG. 13, when the resource corresponding to the second coding block that is fixedly allocated in the (i+1)- th frame is allocated to another user through contribution, the mobile station receives the MAP IE including the contribution bitmap and does not use the resource that is contributed according to the contribution bitmap.

Figure 14:
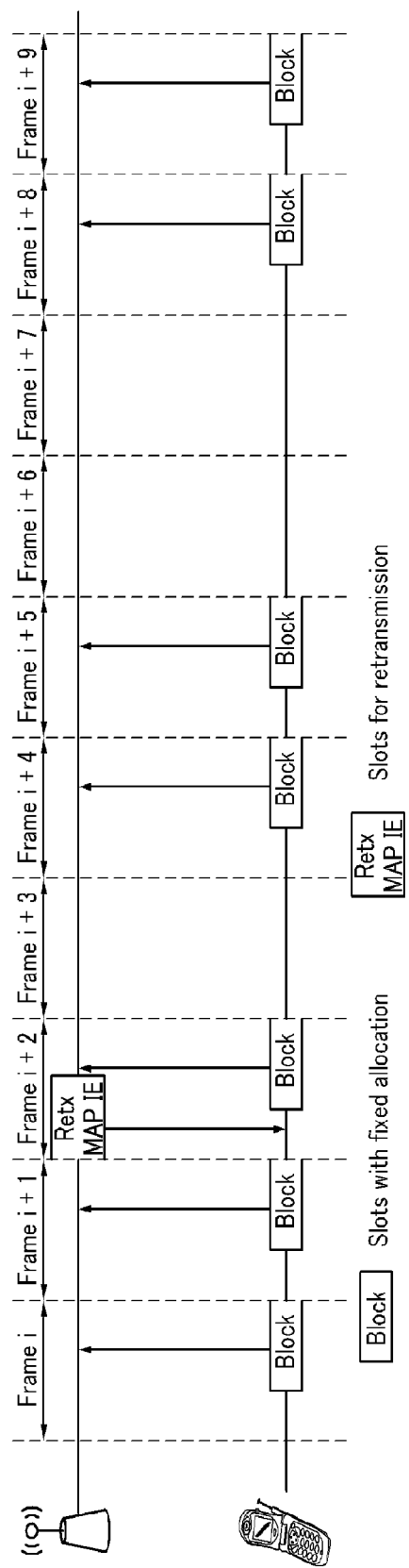
FIG. 14 shows a resource allocation method according to a MAP IE for retransmission.

Referring to FIG. 14, a resource allocation method for retransmission will now be described.

FIG. 14 shows a resource allocation method according to a MAP IE for retransmission.

The resource allocation method over a plurality of frames is different from the resource allocation method for retransmission in that the transmitter side uses the receipt information.

Regarding a retransmission function, a transmitter having received retransmission request information retransmits corresponding data, and in the case of the resource allocation method over a plurality of frames, the base station allocates the resource in consideration of the radio channel and unidirectionally transmits the data over a plurality of frames.

In this instance, when the data that are transmitted over a plurality of frames are not normally received by the receiver, a retransmission request is performed by a feedback of received information.

That is, when a retransmission request is received after the resource allocation and transmission method are performed over a plurality of frames, the transmitter retransmits the corresponding data.

In FIG. 14, when a fixed resource is allocated at regular periods of four frames and a Retx MAP IE for retransmission is transmitted to the mobile station in the (i+2)-nd frame, the mobile station additionally retransmits the corresponding coding block.

The Retx MAP IE has a MAP IE similar to that of the allocation of a plurality of frames of the packet method, and a field for indicating frame information for defining retransmitted data is added thereto.

The added field is expressed with the least significant bit (LSB) of the frame number or a number of previous frames with reference to the current frame, or it can be expressed with the method of showing the number of the current burst and the previous bursts.

For example, when the current frame number is 20 and the frame number having data to be retransmitted is 10, the frame number field indicates 10 to indicate the data that are transmitted ten frames before the current frame number 20.

The burst number field sequentially assigns numbers to the transmitted bursts and shows to which previous bursts they respectively correspond with reference to the currently transmitted burst.

Accordingly, when performing the retransmission function, the base station performs retransmission with reference to the coding block, determines the number of coding blocks in consideration of received information and the channel environment, and allocates the corresponding resource.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for receiving signals comprising:
allocating, by a base station, a communication resource corresponding to a mobile station over a plurality of frames when power required by the communication resource of a frame is less than the maximum power of the mobile station;
transmitting allocation information of the communication resource to the mobile station; and
receiving a transmitted signal through the communication resource,
wherein the transmitted signal includes at least two coding blocks that are channel coded for a datum, and
transmitting the allocation information of the communication resource includes transmitting a single piece of allocation information to the mobile station in the plurality of frames for transmitting the coding block of the datum.

2. The method of claim 1, wherein
the allocation information of the communication resource includes transmission period information of the data.

3. The method of claim 2, further including,
when the communication resource is additionally needed, additionally allocating the communication resource to the mobile station; and wherein the additional allocation information of the communication resource to the mobile station in the frame includes the communication resource.

4. The method of claim 2, further including,
when the communication resource allocated to the mobile station is allocated to another mobile station,
allocating the communication resource to the other mobile station; and
transmitting information on the allocation of the communication resource to the other mobile station to the mobile station in the frame including the communication resource.

5. The method of claim 2, further including,
when the coding block is requested to be retransmitted,
allocating the communication resource for the retransmission; and
transmitting allocation information of the communication resource to the mobile station in the frame including the communication resource.

6. A base station for use in a wireless communications system, the base station comprising:
a transmitter configured to allocate a communication resource corresponding to a mobile station over a plurality of frames when the power required by the communication resource of a frame is less than the maximum power of the mobile station and transmit allocation information of the communication resource to the mobile station; and
a receiver configured to receive a transmitted signal through the communication resource,
wherein the transmitted signal includes at least two coding blocks that are channel coded for a datum, and
the transmitter further is configured to transmit a single piece of allocation information to the mobile station in the plurality of frames for transmitting the coding block of the datum.

7. The base station of claim 6, wherein allocation information of the communication resource includes transmission period information of the data.

8. The base station of claim 7, wherein the transmitter is configured to, when the communication resource is additionally needed, additionally allocate the communication resource to the mobile station; and wherein the additional allocation information of the communication resource to the mobile station in the frame includes the communication resource.

9. The base station of claim 7, wherein the transmitter is configured to, when the communication resource allocated to the mobile station is allocated to another mobile station, allocate the communication resource to the other mobile station; and wherein the additional allocation information on the allocation of the communication resource to the other mobile station to the mobile station in the frame includes the communication resource.

10. The base station of claim 7, wherein the transmitter is configured to, when the coding block is requested to be retransmitted:
   allocate the communication resource for the retransmission; and
   transmit allocation information of the communication resource to the mobile station in the frame including the communication resource.

11. A transmitter for use in a base station in a wireless communications system, the transmitter comprising:
   at least one antenna; and
   processing circuitry configured to allocate a communication resource corresponding to a mobile station over a plurality of frames when the power required by the communication resource of a frame is less than the maximum power of the mobile station and transmit allocation information of the communication resource to the mobile station such that a transmitted signal can be received by the base station through the communication resource,
   wherein the transmitted signal includes at least two coding blocks that are channel coded for a datum, and
   the processing circuitry further is configured to transmit a single piece of allocation information to the mobile station in the plurality of frames for transmitting the coding block of the datum.

* * * * *